Sept. 19, 1961  M. PIET ET AL  3,000,655
QUICK DETACHABLE COUPLING
Filed March 18, 1957

MEYER PIET,
MURRAY A. CHILCOAT, INVENTORS.

BY
Attorney

United States Patent Office 3,000,655
Patented Sept. 19, 1961

3,000,655
QUICK DETACHABLE COUPLING
Meyer Piet, Arcadia, and Murray A. Chilcoat, Monterey Park, Calif., assignors to Futurecraft Corporation, El Monte, Calif., a corporation of California
Filed Mar. 18, 1957, Ser. No. 646,681
5 Claims. (Cl. 284—19)

The invention relates to fluid couplings of the quickly disconnectible type for connecting ducts and/or fluid containers.

It is an object of the invention to provide a quick-disconnecting coupling comprising first and second coupling parts having valve means adapted to close off the passages through the connector parts when they are disconnected.

It is an object of the invention to provide a coupling of this character wherein the first connector part has therein a cavity adapted to receive a hollow member which projects from the second connector part, there being means for effecting opening of the valve means of the coupling when the hollow member is positioned within the cavity of the first connector part.

Further objects of the invention provide in this fluid coupling means whereby fluid pressure is utilized to hold the first and second connector parts in connected relation and wherein the valves are hydraulically balanced when the connector parts are connected together for conveying fluid under pressure.

Further objects and advantages of the invention may be brought out in the following part of the specification wherein the description of small details has been for the purpose of competence of disclosure, without intending to limit the scope of the invention which is defined by the appended claims.

Referring to the accompanying drawings which are for illustrative purposes only:

Figure 2:
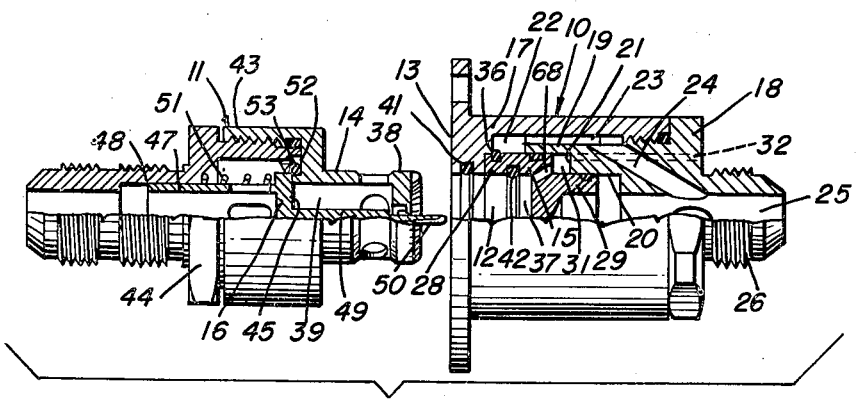
FIG. 2 is a view of the coupling with the parts thereof disconnected.

The connector includes first and second connector parts 10 and 11. Referring to FIG. 2, it will be perceived that the first connector part 10 has a cavity 12 extending inward from the front face 13 thereof. The second connector part 11 has a projecting hollow member 14 adapted to enter the cavity 12 when connection of the parts 10 and 11 is accomplished.

Figure 1:
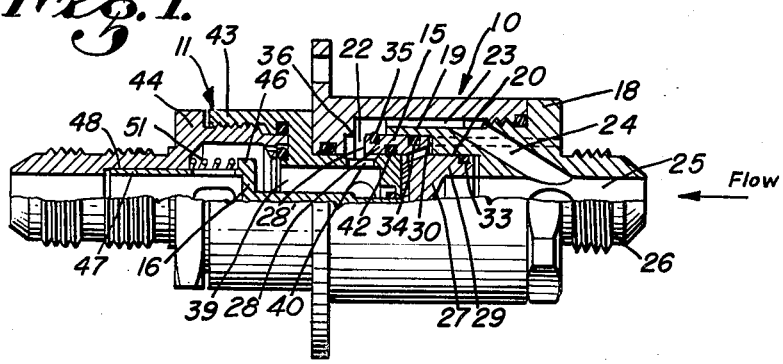
FIG. 1 is a view of the coupling with the parts thereof connected.

The connector parts 10 and 11, respectively, have valve means 15 and 16 which are closed when the connector parts 10 and 11 are separated, as shown in FIG. 2, and are open when the parts 10 and 11 are connected as shown in FIG. 1. The connector part 10 comprises interfitting shells 17 and 18 defining a ported cylindrical wall 19 and a cylindrical wall 20 of smaller diameter, these walls 19 and 20 surrounding the cavity 12. The inner surfaces of the cylindrical walls 19 and 20 define a pair of cylindrical bores which are coaxial with each other, the first or inner bore being defined by the inner wall 20 and the second or outer bore being defined by the outer wall 19. The cylindrical walls 19 and 20 are separated by an annular shoulder 21. The ported cylindrical wall 19 has a port 22 which communicates, as shown in FIG. 1, with the cavity 12 when the valve means 15 is in open position. The port 22 is connected through longitudinal passages 23, formed between the shells 17 and 18, with diagonal passages 24 in the shell 18 arranged to communicate with the axial opening 25 of the shell 18. The shell 18 is provided with a threaded fitting 26 by which the connector part 10 may be connected to a fluid duct or other fluid containing or conveying means.

The valve means 15 comprises a displaceable valve member 27 positioned in the recess 12, having a cylindrical closure wall 28, having an annular front end face 28' adapted to be moved axially along the ported wall 19, and a smaller annular wall 29 which is arranged in sliding engagement with the smaller cylindrical wall 20, there being a radial annular shoulder 30 between the annular walls 28 and 29 of the displaceable valve 27 in confronting relation to the annular shoulder 21. The annular chamber 31, formed between the annular shoulders 21 and 30 which are of the same area as the front end wall, is connected to the exterior of the part 10 by a duct 32 which is drilled in the shell 18. A sealing ring 33 supported in the annular wall 29 makes sealing engagement with the smaller cylindrical wall 20. A sealing ring 34 is supported by the annular closure wall 28 for sealing engagement with the cylindrical wall 19. The forward (leftward) end of the closure wall 28 carries a sealing ring 35 which projects radially outwardly from the cylindrical outer face of the member 28 and is adapted to engage an annular shoulder 36 at the forward end of the port 22 when the displaceable valve 27 is disposed in its forward, port closing position shown in FIG. 2. The forward end of the displaceable valve 27 has therein a recess 37 adapted to receive the end portion 38 of the hollow projection 14 of the second connector part 11 when the connector part 11 is moved from the position in which it is shown in FIG. 2 to the position in which it is shown in FIG. 1 so that the hollow member 14 enters the cavity 12 and displaces the displaceable valve 27 from its port closing position of FIG. 2 to the open position thereof shown in FIG. 1, whereupon the fluid port 22 of the connector part 10 communicates with the interior space 39 of the hollow member 14 through radial openings 40 in the hollow member 14 adjacent the front end 38 thereof. The shell 17 carries a sealing ring 41 and the annular closure wall 28 carries a sealing ring 42, for engagement with the outer surface of the hollow member 14 when it is inserted in the cavity 12 and in the recess 37 of the displaceable valve 27.

Figure 4:
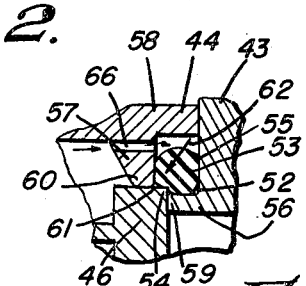
FIG. 4 is an enlarged fragmentary sectional view showing a form of sealing means employed in connection with the closure member of the second connector part of the coupling.

The second connector part 11 comprises shells 43 and 44 which are screwed together to form an assembly which encloses a valve closure 45 as part of the valve means 16. The closure 45 comprises a circular valve plate 46, a tubular wall 47 serving as a guide and being slidable in the axial bore 48 of the shell 44, and a thrust member 49 which extends axially from the plate 46 through the hollow member 14 and through the end 38 thereof so that its projecting end 50 will be engaged by transverse portion of the displaceable valve 27 when the hollow member 14 is moved into the cavity 12, to positively displace the valve closure 45 against the action of a spring 51 from the closed position thereof shown in FIG. 2 to the open position of the closure 45 shown in FIG. 1. The valve plate is arranged to engage a sealing ring contained in an annular channel 52 defined by a radial wall 55 and an inner cylindrical wall 56 of the shell 43 and by a radial wall 57 and a cylindrical wall 58 of the shell 44. The inner cylindrical wall 56 has a lip 59 defining a radial annular shoulder positioned so as to be engaged by the peripheral portion of the valve plate 46. This lip 59 of the cylindrical wall 56 is spaced from the lip 60 of the radial wall 57 so as to define for the annular channel 52 an annular mouth 61 which, as indicated by the arrow 62, FIG. 4, is faced diagonally inwardly and in upstream direction with respect to the closing action of the valve means 16. As the closure plate 46 moves from the position in which it is shown in FIG. 1 toward the position in which it is shown in FIG. 2, the peripheral portion thereof traverses the lip 60 of the radial wall 57 and then, before the plate 46 comes into engagement with the shoulder 59 the lip 54 of the plate 46 engages the portion of the ring 53 which is exposed in the annular mouth 61, slightly indenting the same as shown in FIG. 4. Openings 66 through the root portion of the radial wall 57 transmit fluid pressure to the outer portion of the channel to force the sealing ring radially inwardly and tightly in engagement with the lip 54 of the valve plate 46.

Figure 3:
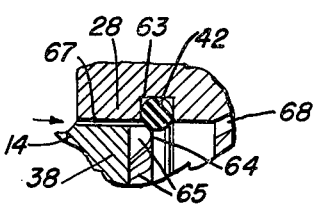
FIG. 3 is an enlarged fragmentary view showing the means of the invention for preventing displacement of a sealing ring which is adapted to form a seal between disconnectible parts.

The invention provides means for preventing the sealing ring 42 from being blown out of the channel 63, FIG. 3, which receives the same during the time the member 14 is being moved leftwardly from the position in which it is shown in FIG. 1 through the position in which it is shown in FIG. 3. This means comprises a rounded lip 64 which projects rightwardly from the peripheral portion of the end wall 38 of the hollow member 14, this lip 64 having therein a plurality of radial slots 65 cut thereacross so that fluid under pressure which passes through the space 67 between the peripheral portion of the end wall 38 of the hollow member 14 and the closure wall 28 will not be diverted into the bottom of the channel 63 so as to force the ring 42 out of the channel, but may escape through the slots 65 as the lip 64 is moving leftwardly across the exposed face of the ring 42 to hold the ring 42 in the channel 63. The rightward end or bottom of the recess 37 is connected through a passage 68 with the annular space 31 between the shoulders 21 and 30, to relieve the pressure in the recess 37 adjacent the face of the wall 38. The area of the face 28' is slightly greater than the area of the rightward end of the member 27 which is slidable in the opening defined by the cylindrical wall 20, and since the bottom of the recess or space 39 and the recess 31 are both vented to atmosphere, the fluid differential pressure acting axially upon the displaceable valve 27, when the parts 10 and 11 are connected, as shown in FIG. 1, is in rightward direction, therefore, holding the member 27 in the rightward position in which it is shown in FIG. 1. When the connector parts 10 and 11 are disconnected, as shown in FIG. 2, axial fluid pressure in the passage 25 will hold the part 27 leftwardly in port closing position. The connector part 11 is completely balanced internally. When the parts 10 and 11 are coupled under pressure there are no forces exerted by this pressure tending to either hold the connector parts 10 and 11 together or apart. The coupling engagement of the parts 10 and 11 cannot be effected while either or both of the parts are pressurized.

We claim:

1. In a quick disconnecting coupling for fluid ducts: a first connector part having a first cylindrical side wall defining a bore; a second cylindrical side wall of larger diameter defining a second coaxial bore adjoining the forward end of said first bore, said walls being separated by an annular shoulder; a valve port in the forward end of said second cylindrical wall; a displaceable valve member in said bores having a larger forward annular wall slidable along said second cylindrical wall between a position covering said port and a position uncovering said port, said valve member having a smaller rearward annular wall slidable along said first cylindrical wall and separated from said second wall by an annular shoulder, the rearward end of said shoulder confronting the annular shoulder between said bores, said valve member having a central portion extending across said first bore; an opening extending through said first connector part from the annular space between said annular shoulders to the exterior of said connector part; and a duct extending through said first connector part from said port to a portion of said bore rearwardly from said closed portion, said central portion of said valve member being subject to fluid pressure entering said bore to normally urge said valve member into a forward position closing said port, the annular shoulder of said valve member being subject to rearward fluid pressure from said bore through said duct and port when said valve member is moved to port opening position, the area of the annular shoulder of said valve member being at least equal to the area of said central portion so that said valve member is subject to substantially equal fluid pressures when said valve member is in port opening position.

2. The structure described in claim 1 and the larger front annular wall of said valve member forming an open space facing the forward end of said connector part, said open space being closed on its inner end by the central portion of said valve member except for a passage extending through said valve member to connect said open space to the annular space between said shoulders; and a second connector part having a vented hollow member adapted to enter said open space and engage said central portion to displace said valve member rearwardly into a position uncovering said port, the end of said hollow member closing said passage.

3. The structure described in claim 1, the larger forward annular wall of said valve member forming an open space extending forwardly from said closed portion and facing the forward end of said connector part; a second connector part having a vented hollow member at its forward end directed toward the forward end of said first connector part and adapted to enter said open space to engage said central portion and displace said valve member rearwardly into a position uncovering said port; a fluid passage within said connector part; a valve closure slidably mounted within said passage for rearward movement to open position permitting communication between said fluid passage and said hollow member; and a projection connected to said valve closure and extending through the front end of said hollow member, said projection adapted to engage the central portion of said valve member to open said valve closure.

4. In a quick disconnecting coupling for fluid ducts: a connector part having a first cylindrical side wall defining a first bore; a second cylindrical side wall of greater diameter defining a second coaxial bore adjoining the forward end of said first bore; a valve port in the forward end of said second cylindrical wall; a valve member mounted within said bores for movement between positions opening and closing said port; a duct extending through said connector part from said port to a portion of said first bore disposed rearwardly from said valve member, said first and second cylindrical walls being separated by an annular shoulder; and a duct extending through said connector part from said shoulder to the exterior, said valve member having a central portion extending transversely across said first bore and a forward outer annular shoulder portion slidably mounted within said second bore, said central portion being subject to fluid pressure entering said bore to normally urge said valve member into a forward position closing said port, the annular shoulder of said valve member being subject to rearward fluid pressure from said bore through said duct and port when said valve member is moved to port opening position, the area of said annular shoulder portion being substantially equal to the area of said central portion, so that said valve member is subject to equal fluid pressures when said valve member is in port opening position.

5. In a quick disconnecting coupling for fluid ducts: a first connector part having a cylindrical side wall defining a forward opening bore, said cylindrical side wall having a valve port in the forward end thereof; a smaller cylindrical side wall separated from said first cylindrical wall by an annular shoulder; a displaceable valve member in said bore having a larger annular wall slidable along said first cylindrical wall between a position covering said port and a position uncovering said port, said valve member having a central closed portion with an annular wall slidable along said smaller cylindrical wall and separated from said larger annular wall by an annular shoulder confronting the annular shoulder of said bore, said closed portion being subject to fluid pressure entering said bore to normally urge said valve member into a forward position closing said port; a duct extending through said first connector part from the annular space between said shoulders to the exterior of said first connector part, duct means extending through said first connector part from said port to a portion of said bore rearwardly from said closed portion; and a second connector part having a portion adapted to enter said bore, said portion being adapted to displace said valve member into a position uncovering said port, the annular shoulder of said valve member being subject to rearward fluid pressure from said bore through said duct and port when said valve member is moved to port opening position, the area of the annular shoulder of said valve member being at least equal to the area of the closed portion, so that said valve member is balanced against forward movement tending to eject said second connector part from said bore.

References Cited in the file of this patent
UNITED STATES PATENTS

| | | |
|---|---|---|
| 2,453,741 | Bopp | Nov. 16, 1948 |
| 2,509,444 | Mitchell | May 30, 1950 |
| 2,553,680 | Scheiwer | May 22, 1951 |
| 2,599,935 | Pasker | June 10, 1952 |
| 2,665,928 | Omon et al. | Jan. 12, 1954 |